United States Patent [19]

Danbach et al.

[11] Patent Number: 4,944,568
[45] Date of Patent: Jul. 31, 1990

[54] FIBER OPTIC CONNECTOR ASSEMBLY

[75] Inventors: Philip J. Danbach, Naperville; Stephen Sampson, Downers Grove, both of Ill.

[73] Assignee: Molex Incorporated, Lisle, Ill.

[21] Appl. No.: 384,203

[22] Filed: Sep. 5, 1989

[51] Int. Cl.⁵ .................... G02B 6/36; H01R 13/64; H01J 5/16

[52] U.S. Cl. ......................... 350/96.20; 350/96.15; 250/227.11; 439/246; 439/247; 439/248; 439/577

[58] Field of Search ............... 350/96.20, 96.15, 96.21, 350/96.17, 96.22; 250/227; 439/246, 247, 248, 577

[56] References Cited

U.S. PATENT DOCUMENTS

| | | | |
|---|---|---|---|
| 4,081,208 | 3/1978 | Meade | 350/96.20 |
| 4,167,303 | 9/1979 | Bowen et al. | 350/96.21 |
| 4,217,030 | 8/1980 | Howarth | 350/96.21 |
| 4,470,660 | 9/1984 | Hillegonds et al. | 350/96.21 |
| 4,529,263 | 7/1985 | Moriyama et al. | 350/96.20 |
| 4,597,631 | 7/1986 | Flores | 350/96.20 |
| 4,697,859 | 10/1987 | Fisher, Jr. | 439/246 |
| 4,699,455 | 10/1987 | Erbe et al. | 350/96.20 |
| 4,721,358 | 1/1988 | Faber et al. | 350/96.21 |
| 4,767,181 | 8/1988 | McEowen | 350/96.21 |
| 4,789,351 | 12/1988 | Fisher, Jr. et al. | 439/248 |
| 4,799,952 | 10/1988 | Hayashi et al. | 350/96.21 |

FOREIGN PATENT DOCUMENTS 0064618 11/1982 European Pat. Off. ..... 350/96.20 X

Primary Examiner—Brain Healy
Attorney, Agent, or Firm—Louis A. Hecht; Stephen Z. Weiss

[57] ABSTRACT

A connector assembly for blind mated back plane interface connections of optic fibers with active optical devices includes a shroud mounted in a back plane panel within which are received a receptacle assembly mated to connector modules. The modules, each associated with a cable of a plurality of optical fibers, subdivide the mated fibers into separately connected groups to avoid expensive tolerance requirements. The receptacle includes a housing and shims for precisely locating the active optical devices relative to the ends of the optic fibers. The interface connections are shielded from interference by conduction between the receptacle housing, a fiber termination ferrule and a rear housing and strain relief portion of each connector module.

16 Claims, 6 Drawing Sheets

FIBER OPTIC CONNECTOR ASSEMBLY

FIELD OF THE INVENTION

The present invention relates to connector assemblies for fiber optic cables and more particularly to blind mating plane fiber optic connector interface assemblies.

DESCRITPION OF THE PRIOR ART

Fiber otpic signal transmission lines are often used instead of electical conductors because of advantages including wide bandwidth capability, electrical isolation and decreasing cost. Fiber optic systems require interfaces where electrical signals are converted to optical signals and optical signals are converted to electrical signals. Typically the signals are converted by optically active devices, for example an electrically operated light source such as a light emitting diode or a light detecting element such as a photosensitive diode or transistor. Fiber optic connector assemblies are used for connecting the ends of fiber optic cables in light transmitting relationship with optically active devices.

Modern telecommunication systems employ numerous signal transmission lines and are subject to the requirements of high signal density and good signal quality. Because of such requirements, fiber optic transmission lines are becoming common for telecommunications. Known fiber optic connector system are subject to problems in this type of environment. In the back plane interconnection arrangements used in telephone systems, blind mating is necessary and this leads to difficulties when many signal transmission lines are connected simultaneously by a single connector assembly. This problem is particularly vexing because of the precise alignment required at fiber optic interfaces.

Another problem involves interference from external sources or from cross talk that can occur when signals are coupled between adjacent channels or lines. This problem becomes more serious at the higher frequencies that are employed for digital or multiplexed signals or the like. Known fiber otpic connector systems are deficient in preventing this type of interference between transmitted signals.

Yet another difficulty arises from the fact that effective coupling of optical signals depends upon the alignment between the connected elements or devices. In an interface connector system, the end of the optic fiber should be optically aligned accurately with the mating optically active device. If the elements are not mated in a coaxial and precisely spaced relationship, signal quality is lowered due to a decrease in transmitted light. Some known connector assemblies are incapable of assuring the alignment needed for high quality signal transmissions, while others rely upon expensive and complex structural arrangements or sensitive labor intensive adjustments for optical alignment.

SUMMARY OF THE INVENTION

Among the objects of the present invention are to provide a fiber optic connector assembly that can be blind mated even where many connections are made with a single connector assembly; to provide an assembly in which electrical interference is avoided; to provide an assembly in which accurate optical alignment is achieved reliably and consistently; and to provide an improved fiber optic connector assembly overcoming disadvantages of those used in the past.

In brief, the objects and advantages of the invention are achieved by providing a fiber optic connector assembly for interconnecting a plurality of active optical devices to a plurality of optical fibers each terminated in a ferrule having a nose portion. The assembly comprises a receptacle including a body member for supporting the plurality of active optical devices, the body member having a flat, planar mating face and a plurality of recesses each extending between the mating face and one of the active optical devices. Connector means includes housing means with a plurality of ferrule receiving cavities and includes a mating end. One of the ferrules is supported in each of the cavities with the nose portion projecting from the mating end. The housing means is supported adjacent the receptacle body with each of the nose portions received in one of the recesses. The connector means includes at least two similar separately mateable connector modules each including a module housing with a plurality of the ferrul receiving cavities. A shroud is interposed between the receptacle and the connector modules, the shroud including a peripheral wall extending between an open receptacle end and an open connector module end. The receptacle end is configured to receive the mating face within the peripheral wall. The connector modules are receivable in the connector module end of the shroud for independent compliance of each connector module with a different portion of the receptacle.

In accordance with another aspect of the invention, there is provided a fiber optic connector assembly for coupling the end of an optic fiber to an active optical device comprising a ferrule capturing the end of the optic fiber, the ferrule having a body with a flange and a nose portion terminating substantially at the end of the optic fiber. A connector housing has a cavity receiving the ferrule. Spring means engages the flange for resiliently urging the nose portion to project from the housing. A receptacle has a body including a mating face, a recess for supporting the active optical device and an opening extending from the mating face to the recess. Means are provided for holding the connector housing adjacent to the receptacle with the projecting nose portion received in the openings. A radial step on the nose portion is urged by the spring into contact with the mating face of the receptacle housing. The nose portion has a reduced diameter end segment extending from the radial step and received in the opening. Shim means in the receptacle housing recess positions the acitve optical device a predetermined distance from the mating face.

In accordance with another aspect of the invention, there is provided a fiber optic connector assembly for use with an optic fiber and an active optical device. The assembly includes a conductive metal receptacle body supporting the active optical device and a connector housing movable to a mated position with a forward end adjacent the receptacle body. The connector housing includes wall means defining a cavity. A conductive metal spring retention clip is engageable with the wall means adjacent a rear end of the cavity. A conductive metal ferrule surrounds the end of the optic fiber, the ferrule being received in the cavity and inlcuding a nose portion projecting from the forward end of the connector housing. A conductive metal spring in the cavity is in contact with and in compression between the ferrule and the spring retention clip, the spring urging the ferrule nose portion into contact with the receptacle body and completing a continuous electrical circuit between the receptacle body and the spring retention clip.

BRIEF DESCRIPTION OF THE DRAWINGS

The present invention together with the above and other objects and advantages may best be understood from the following detailed description of the embodiment of the invention illustrated in the drawings, wherein.

DETAILED DESCRIPTION OF THE PREFERRED EMBODIMENT

Figure 1:
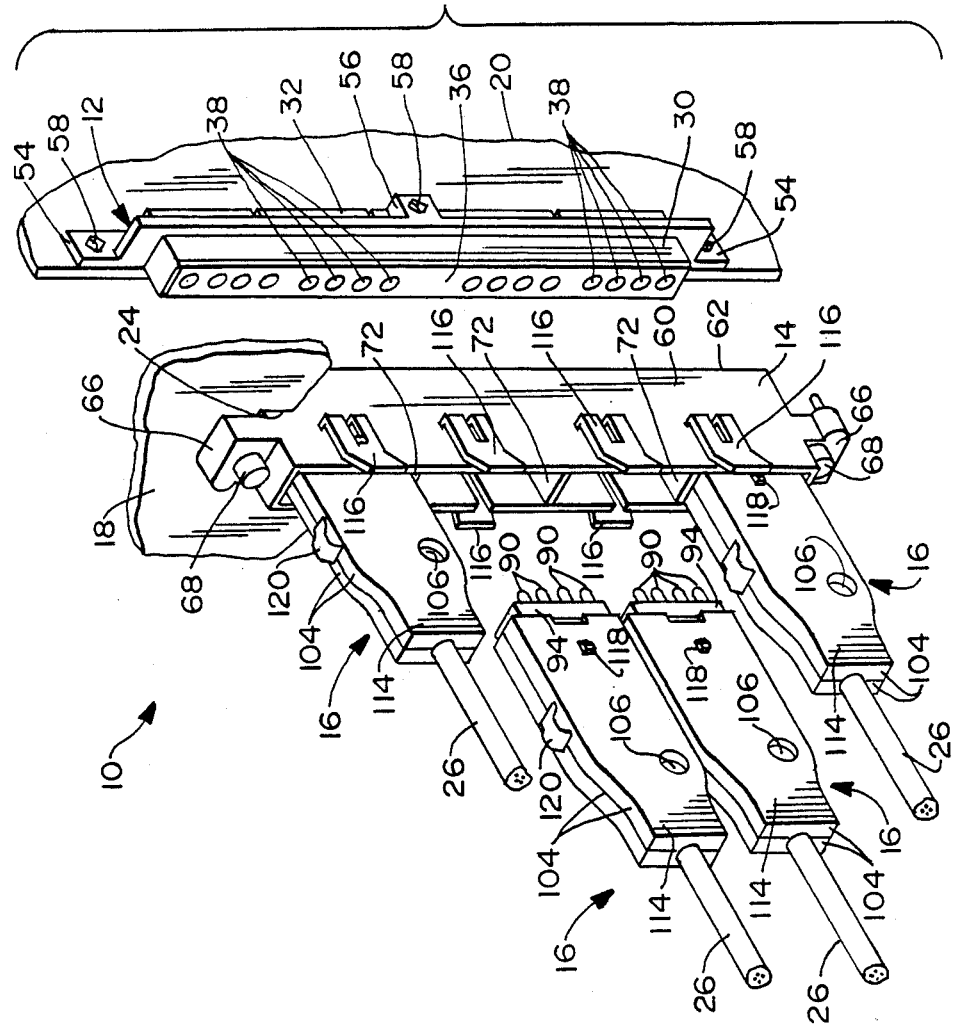
FIG. 1 is a fragmentary perspective view of a fiber optic connector assembly of the present invention in a blind mated back plane installation.

In FIG. 1 there is shown a fiber optic connector assembly embodying the principles of the present invention and generally designated as 10. Assembly 10 includes a receptacle assembly 12, a shroud 14 and four similar connector modules 16. The assembly is illustrated as installed in a back plane installation such as used in telecommunications switching equipment including a panel or back plane 18 and a printed circuit board or daughter board 20. The panel 18 is part of the case or housing of the telecommunications equipment. Borad 20 is inside this housing and modules 16 are outside.

Receptacle assembly 12 is mounted on an edge of the daughter board 20 and supports active optical devices 22 (FIGS. 2 and 3) that are electrically connected to conductive regions on the board 20. The shroud 14 is supported at an aperture 24 in the back plane panel 18. Each connector module 16 is associated with a fiber optic cable 26 including optical fibers 28. The components of the assembly 10 are mated to complete electrical-optical interfaces between the fibers 26 and the devices 22.

Optic fibers 28 serve to carry optical signals in the form of modulated light to and from the telecommunications equipment housed behind the back plane 18. in back plane installations such as seen in FIG. 1, the daughter board 20 is an interchangeable and modular unit selected and installed in accordance with the requirements of the associated signal transmission lines. Removal and replacement may be required for upgrade or repair or the like. The board 20 is typically mounted from a region away from the back plane 18, and is blind mated at the shroud 14 because the interconnection region is not readily visible to the installer.

A total of sixteen fiber optic transmission lines are coupled by the assembly 10 to the daughter board 20. The principles of the invention may be applied to connector assemblies having more or fewer connected transmission lines. The requirement for a large number of connections and the requirement for precise optical alignment with the optical devices 22 makes conventional fiber optic connectors unsatisfactory in installations like the telecommunications equipment illustrated in the drawings. In accordance with the present invention, the group of interface connections is subdivided through the use of the connector modules 16 and the shroud 14 to permit connections easily to be made with the receptacle assembly 12. In addition, in accordance with the invention, the connections made between the optical fibers 28 and the optical devices 22 are optically aligned with precision and are shielded from electrical interference.

Referring in more detail to the construction of the components of the cable assembly 10, the receptacle assembly 12 includes a forward support housing 30 and a rear housing 32. While the rear housing may be made of a molded plastic material, the forward support housing is made of metal such as nickel plated zinc in order to provide the chacteristics of dimensional accuracy and electrical conductivity. The housings 30 and 32 are attached to one another in any suitable manner such as by fasteners (not seen). A series of recesses 34 are defined within the receptacle assembly 12 for receiving the optical devices 22. Recesses 34 include portions formed in both the forward and rear housings 30 and 32. A flat, planar mating face 36 is defined at the front of forward housing 30, and an opening 38 extends between face 36 and each of the recesses 34. The dimension between the front of each recess 34 and the mating face 36 is precisely controlled.

One optical device 22 is captured in each recess 34 between a rear shim 40 and a front shim or alignment sleeve 42. Each device 22 includes a lens or aperture 44 communicating through an opening in the corresponding alignment sleeve 42 with the opening 38. Each device 22 includes electrical conductors 46 extending rearwardly through an opening in the rear shim 40 and through suitable conductor receiving channels 48 in rear housing 32 for connection in any conventional manner to the daughter board 20.

Each of the optical devices 22 may be a light source such as a light emitting diode for transmitting modulated light signals to an optical fiber 28, or may be a light responsive device such as a photosensitive solid state element for receiving modulated light signals from an optical fiber 28. The use of the shim system including rear shims 40 and alignment sleeves 42 permits the receptacle assembly 12 to be tailored to any specific optical device 22 regardless of its function or dimensions. For any given device 22, the shim 40 and sleeve 42 are configured and dimensioned in order to locate the lens or aperture 44 precisely relative to the opening 38. Thus the device 22 can be spaced a precise distance from the mating face 36 and can be placed with its lens or aperture 44 on the central axis of the opening 38.

Receptacle assembly 12 is attached to an edge of the daughter board 20 as seen in FIG. 1. The forward support housing 30 projects from the board 20 for receipt into the shroud 14. The rear housing 32 is provided with positioning projections 50 for locating the receptacle 12 on the board, and with standoffs 52 permitting conductors 46 to be connected by soldering to conductive areas on the board 20. Foot portions 54 and a central lug 56 permit the receptacle 12 to be attached to the board 20 by fasteners 58.

The devices 22 and the openings 38 are arrayed in groups of four. In a typical arrangement, each group includes a pair of light transmitting devices 22 alternating with a pair of light receiving devices 22. Each of the groups of four corresponds to four optic fibers 28 associated with one connector module 16 and one fiber optic cable 26.

Figure 2:
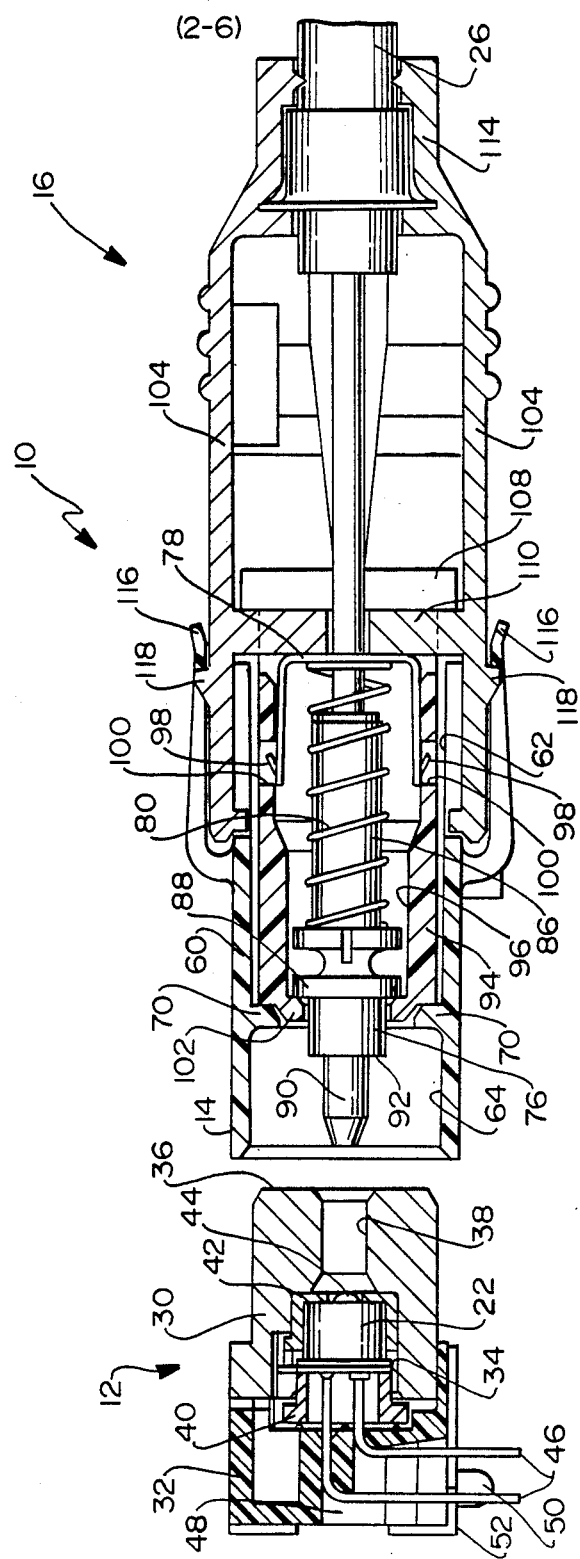
FIG. 2 is a sectional view on an enlarged scale of the assembly of FIG. 1 showing the components prior to mating.
Figure 3:
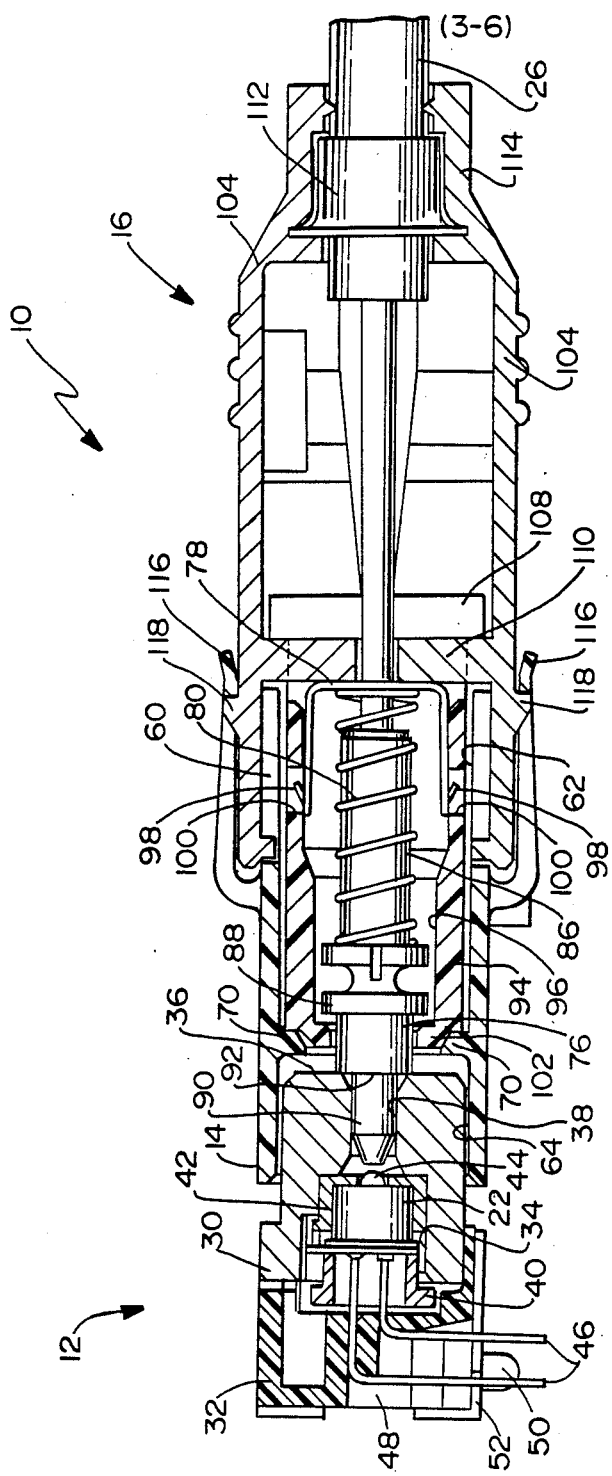
FIG. 3 is a view similar to FIG. 2 showing components in a mated condition.

Shroud 14 seen in FIGS. 1–3 is preferably a unitary and homogeneous molded plastic body. It includes a continuous, outer peripheral wall 60 extending both inside and outside of the back plane panel 18. At the inside of the equipment enclosure defined partly by the panel 18, the shroud 14 includes an open end 62 receiving the receptacle assembly 12. At the outside of the enclosure, the shroud 14 includes an outer open end 64 for receiving the connector modules 16 when they are mated with the receptacle assembly 12. A pair of feet 66 permit the shroud 14 to be attached by fasteners 68 to the back plane panel 18.

Interior walls or stops 70 project from the peripheral wall 60 at the interior of the shroud 14 and lie in a plane perpendicular to the coupling axis and the axis of the openings 38. These walls 70 provide a stop limiting the distance that the connector modules 16 can be inserted into the shroud 14 and also provide a stop limiting the distance that the receptacle assembly 12 can be inserted into the shroud 14.

Additional interior walls 72 extending inwardly from the peripheral wall 60 in the region outside of the interior walls 70. Walls 72 are parallel with the mating axis and subdivide the outer open end 64 into four subcompartments each of which receives one of the connector modules 16. Sufficient clearance is provided to permit independent compliance of each module 16 as it is mated with a different part of the receptacle assembly 12.

Each of the connector modules 16 can be mated to the assembly 10 separately and independently from the others. Because the numerous interface connections are subdivided into groups by discrete modules, the necessity for maintaining accurate and expensive dimensional tolerances for simultaneous mating with all of the devices 22 and openings 38 in the forward housing 30 by a single large connector is avoided. In addition, this arrangement permits individual subgroups of transmission lines constituted by optical fibers 28 to be disconnected for expansion, reconfiguration or repair of the signal transmission system.

Figure 6:
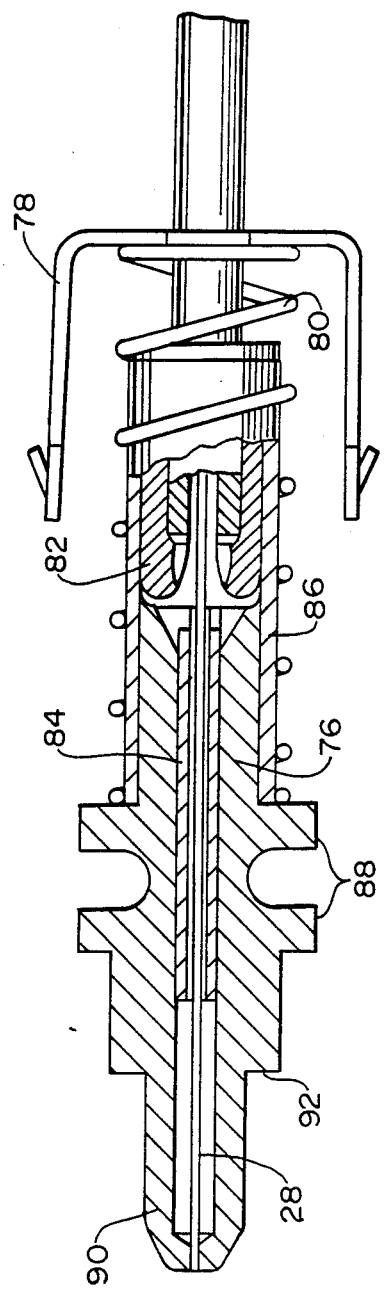
FIG. 6 is a sectional view on a greatly enlarged scale of the ferrule and retention clip associated with one optic fiber of the assembly.

Fiber optic cables 26 each include four jacketed optical fibers 28. Each fiber 28 is terminated in the manner seen in FIG. 6 within a ferrule 76 by a crimp and cleave operation. Prior to termination, an end segment of the cable outer jacket is removed and a conductive metal spring retention clip 78 and a conductive metal coil spring 80 are slidably received over the inner jacket of each individual optical fiber 28. An end segment of the inner jacket is removed from the fiber 28 and the inner jacket is received in an inner tube 82. The uncovered optical fiber extends through an insert 84 located in a bore along the axis of the ferrule 76. The parts are attached together by an electrically conductive, metal outer crimp tube 86.

Ferrule 76 is a conductive metal member having a flange portion 88 and a forwardly projecting nose portion 90. Nose potion 90 includes a radial step 92 and the segment of nose portion 90 forward of the step 92 is of reduced diameter. The end of the optical fiber 28 coincides with the tip or end of the nose portion 90.

Connector modules 16 are identical with one another and interchangeable except that they may be provided with polarizing or keying structure cooperating with structure on the shroud 14 (not shown) to assure that each module 16 is received in a specific position and orientation. Modules 16 each include a molded plastic housing 94 in which are defined four cavities 96 each receiving one of the ferrules 76 with its terminated optical fiber 28. The ferrules 76 are retained in cavities 96 by the retention clips 78. Each retention clip 78 is a stamped and formed, U-shaped spring with resilient legs each provided with a latch tang 98. In assembly of the module 16, one of the ferrules 76 and its retention clip 78 is inserted into each cavity 96 from the rear of the housing 94. The tangs 98 engage latch recesses 100 in opposed walls of the cavity 96.

Spring 80 is initially in compression between the retention clip 78 and the flange portion 88 of the ferrule 76. The force of the spring initially and normally holds the flange portion 88 in contact against a front mating wall 102 of the housing 94 as seen in FIG. 2. The nose portion 90 and the radial step 92 project forwardly through an opening in the mating wall 102 and are resiliently biased forward by the compressed spring 80.

Comparing FIGS. 2 and 3, when a module 16 is mated with the receptacle assembly 12, the reduced diameter segment of nose portion 90 is received in the opening 38 in the forward support housing 30 of the receptacle assembly 12. Bevels are provided in the opening 38 at the mating face 36 and at the tip of nose portion 90 to guide this insertion.

In the mated condition seen in FIG. 3, a precise and accurate alignment is obtained between the end of the optical fiber 28 and the device 22. The walls of the nose portion 90 and of the opening 38 are right circular cylinders parallel with the axis of the opening 38 and are dimensioned for a close fit to position the optical fiber 28 in coaxial alignment with the lens or aperture 44 of the optical device 22. The radial step 92 stops against the mating face 36 of the forward housing 30 of the receptacle assembly 12. Mating face 36 and the step 92 meet at a flat radial plane perpendicular to the axis of the opening 38 and to the axis of the optical fiber 28. Overtravel is permitted by the additional compression of the spring 80 as the flange portion 88 moves away from the front mating wall 102 in the cavity 96. This insures that the end of the optical fiber 28 is precisely spaced an optimum distance from device 22.

Figure 4:
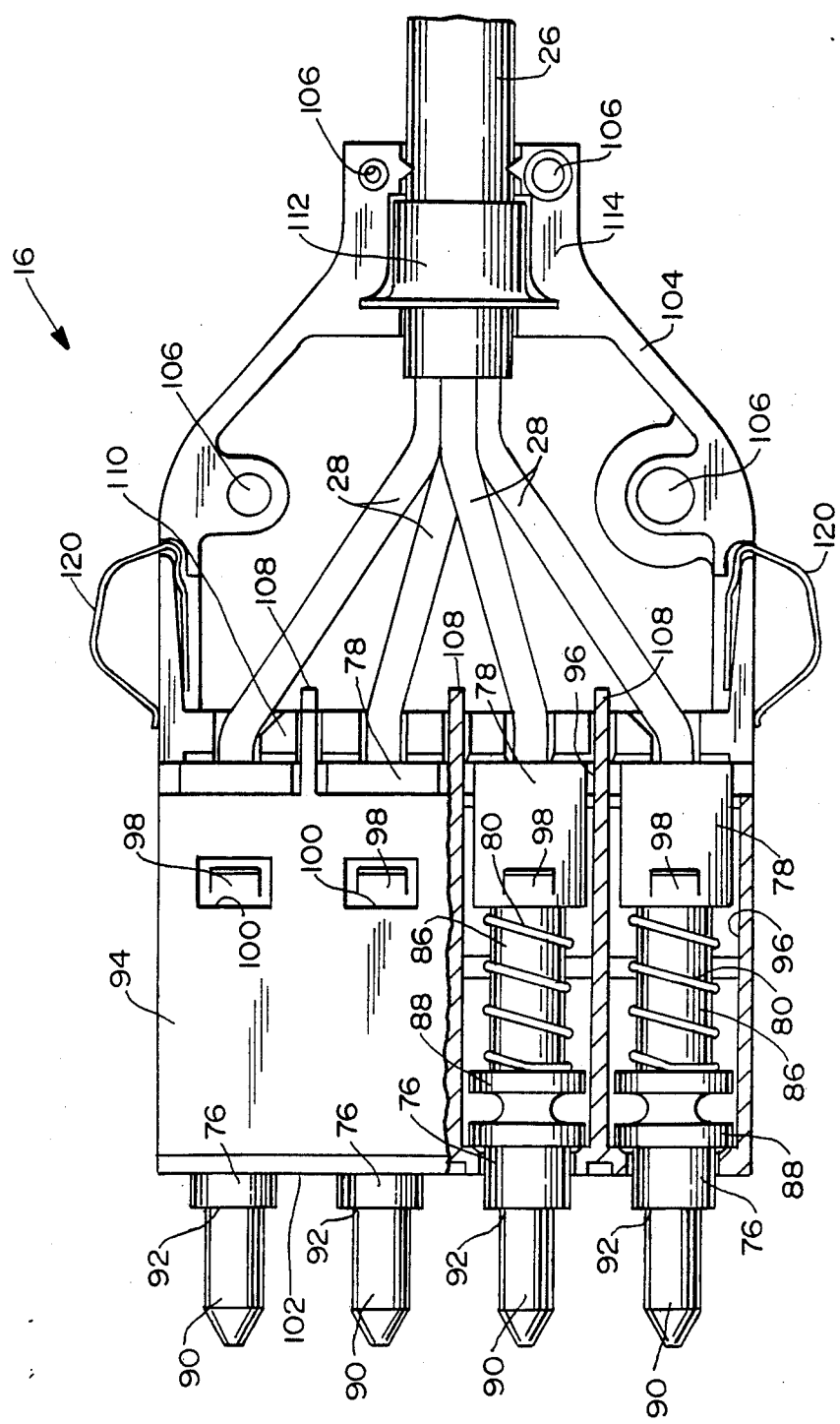
FIG. 4 is a sectional view, with portions broken away, of one connector module of the connnector assembly.
Figure 5:
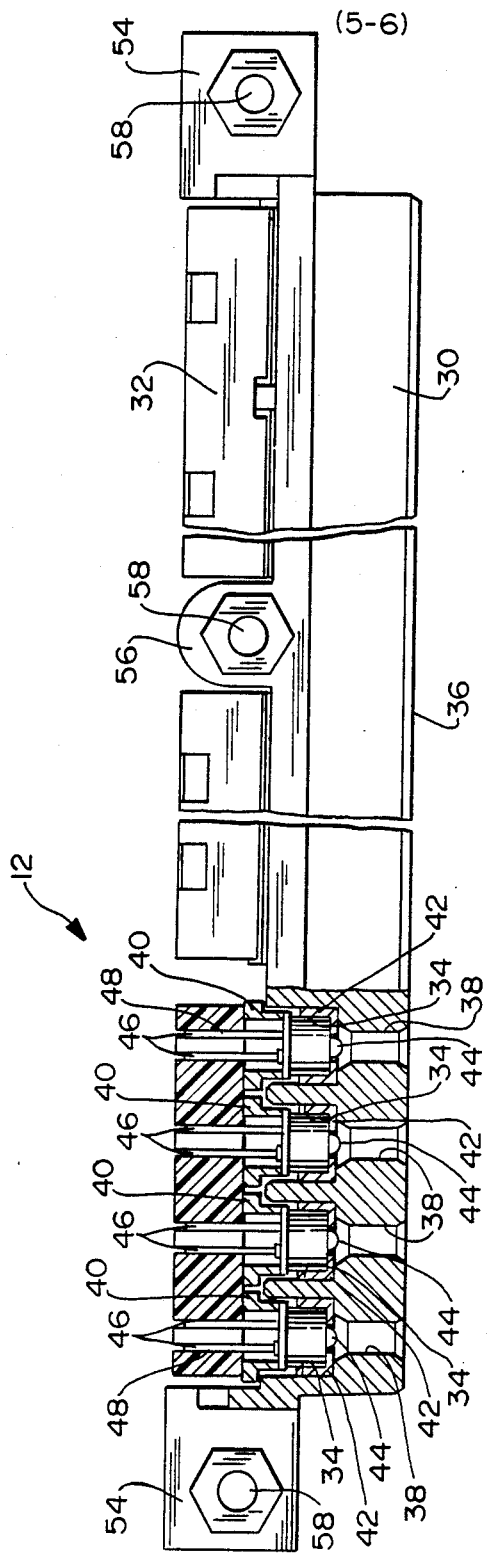
FIG. 5 is a plan view, partly in section, of the receptacle of the assembly of FIG. 1.

A shielding and strain relief housing consisting of similar shell halves 104 is secured to the rear of each module housing 94. Shell halves 104 are secured together by fasteners 106 to capture rearwardly extending T-shaped extensions 108 of housing 94 behind an internal wall 110 (FIGS. 2–4). An eyelet 112 attached to the outer jacket of the fiber optic cable 26 is captured in a neck portion 114 for strain relief. The individual optical fibers 28 extend through openings in the internal wall 110 to the cavities 96 in the housing 94.

When the shell halves 104 are assembled with the housing 94, the wall 110 contacts the bight portion of the spring retention clips 78. As can be seen by the position of the tangs 98 in he openings 100 (FIGS. 2 and 3), engagement of the wall 110 against the retention clips 78 further compresses the coil spring 80.

Shielding of each of the interface connections made by the assembly 10 is accomplished by the present invention. Ferrule 76 is urged by the compressed spring 80 into low resistance electrical contact with the forward support housing 30 of receptacle assembly 12. The compressed spring 80 provides a low resistance electrical connection between the ferrule 76 and the spring retention clip 78. The force of the compressed coil spring 80 provides a low resistance electrical contact between the retention clips 78 and both shell halves 104 of the rear shield and strain relief housing. As a result, electrical interference resulting from cross coupling between adjacent signal transmission lines or from other causes is prevented.

Shroud 14 is provided with latch arms 116 engageable with latch projections 118 on the shell halves 104 for retaining the modules 16 in place in the shroud. The circuit board 20 with the receptacle assembly 12 can be mated and unmated with the modules in position. Spring clip separators 120 are carried at the opposite sides of the shell halves 104 as seen in FIG. 4 for resiliently urging the modules toward a centered position in the range of clearance provided by the shroud 14.

We claim:

1. A fiber optic connector assembly for interconnecting a plurality of active optical devices to a plurality of optical fibers each terminated in a ferrule having a nose portion, said assembly comprising:
   a receptacle including a body member for supporting the plurality of active optical devices, said body member having a flat, planar mating face and a plurality of recesses each extending between said mating face and one of the active optical devices;
   connector means including housing means with a plurality of ferrule receiving cavities and including a mating end;
   means for supporting one of the ferrules in each of said cavities with the nose portion projecting from said mating end;
   said housing means being supported adjacent said receptacle body with each of said nose portions received in one of said recesses;
   the assebmly being characterized by:
   said connector means including at least two similar separately mateable connector modules, said housing means including a corresponding number of at least two module housings each including a plurality of said ferrule receiving cavities;
   a shroud interposed between said receptacle and said connector modules, said shroud including a peripheral wall extending between an open receptacle end and an open connector module end, said receptacle end being configured to receive said mating face within said peripheral wall; and
   said connector modules being receivable in said connector module end of said shroud for independent compliance of each connector module with a different portion of said receptacle.

2. A fiber optic connector assembly as set forth in claim 1, further comprising spring means resiliently positioning said connector modules within within said shroud.

3. A fiber optic connector assembly as set forth in claim 2, said spring means comprising spring members supported on said module housings.

4. A fiber optic connector assembly as set forth in claim 1, further comprising latch means on said shroud and said connector modules for releasably holding said connector modules in said shroud.

5. A fiber optic connector assembly as set forth in claim 1, further comprising first internal wall means extending from said peripheral wall and engageable by said connector modules and by said receptacle housing to limit insertion of said connector modules and of said receptacle housing into said shroud.

6. A fiber optic connector assembly as set forth in claim 1, further comprising second internal wall means extending from said peripheral wall and defining separate subcompartments within said shroud for receipt of said connector modules.

7. A fiber optic connector assembly as set forth in claim 1, said receptacle housing including a number evenly divisible by four of said recesses arranged in a straight line, and each said module housing having four said ferrule receiving cavities arranged in a straight line.

8. A fiber optic connector assembly for coupling the end of an optic fiber to an active optical device comprising:
   a ferrule capturing the end of the optic fiber, said ferrule having a body with a flange and a nose portion terminating substantially at the end of the optic fiber;
   a connector housing having a cavity receiving said ferrule;
   spring means engageable with said flange for resiliently urging said nose portion to project from said housing;
   a receptacle having a body including a mating face, a recess for supporting the active optical device and an opening extending from said mating face to said recess; and
   means for holding said connector housing adjacent to said receptable with said projecting nose portion received in said opening;
   said fiber optic connector assembly being characterized by:
   a radial step on said nose portion urged by said spring into contact with said mating face of said receptacle housing;
   said nose portion having a reduced diameter end segment extending from said radial step and received in said opening; and
   shim means in said receptacle housing recess for positioning the active optical device a predetermined distance from said mating face.

9. The fiber optic connector assembly of claim 8, said mating face and said radial step comprising flat planes perpendicular to the axis of said opening.

10. The fiber optic connector assembly of claim 9, said reduced diameter end segment and said opening comprising cylindrical surfaces parallel to the axis of said opening, and said shim means comprising alignment means for positioning the active optical device both axially and radially with respect to said opening.

11. The fiber optic connector assembly of claim 10, said shim means including an alignment sleeve in said receptacle housing recess engaging one end and a sidewall of the active optical device and a discrete shim element engaging the other end of the active optical device.

12. In a fiber optic connector assembly for use with an optic fiber and an active optical device, the combination comprising:
   a conductive metal receptacle body supporting the active optical device;
   a connector housing movable to a mated position with a forward end adjacent said receptacle body and including wall means defining a l cavity;
   a conductive metal spring retention clip engageable with said wall means adjacent a rear end of said cavity;
   a conductive metal ferrule surrounding the end of the optic fiber, said ferrule being received in said cavity and including a nose portion projecting from said forward end of said connector housing; and a conductive metal spring in said cavity in contact with and in compression between said ferrule and said spring retention clip, said spring urging said ferrule nose portion into contact with said receptacle body and completing a continuous electrical circuit between said receptacle body and said spring retention clip.

13. The combination defined in claim 12, further comprising a step on said ferrule nose portion engageable with said receptacle body for pressing said ferrule into said cavity and further compressing said spring in said mated position.

14. The combination defined in claim 13, further comprising conductive metal rear shielding means engageable with the rear end of said connector housing and including a contact portion in electrical contact with said spring retention clip.

15. The combination defined in claim 14, further comprising mounting means defined on said rear shielding means and on said connector housing for holding said rear shielding means on said connector housing with said contact portion pressing said spring retention clip into said cavity and further compressing said spring.

16. The combination defined in claim 15 wherein said rear shielding means comprises a strain relief housing surrounding the rear end of said connector housing and having means for supporting the optic fiber at a region spaced from the rear end of the connector housing.

* * * * *